United States Patent [19]

Savins et al.

[11] Patent Number: 4,489,042

[45] Date of Patent: Dec. 18, 1984

[54] PROCESS FOR RECOVERY OF MINERAL VALUES FROM SUBTERRANEAN FORMATIONS

[75] Inventors: Joseph G. Savins; Warren F. Johnson, both of Dallas, Tex.

[73] Assignee: Mobil Oil Corporation, New York, N.Y.

[21] Appl. No.: 335,296

[22] Filed: Dec. 28, 1981

[51] Int. Cl.³ ............... C22B 60/02; C01G 43/00; E21B 43/28

[52] U.S. Cl. ...................... 423/20; 423/3; 423/658.5; 423/17; 299/4

[58] Field of Search ............ 423/3, 17, 18, 20, 658.5; 299/4

[56] References Cited

U.S. PATENT DOCUMENTS

| | | | |
|---|---|---|---|
| 565,342 | 8/1876 | Frasch | 299/4 |
| 2,896,930 | 7/1959 | Menke | 423/17 X |
| 3,089,885 | 5/1963 | Kruse | 423/20 X |
| 4,105,253 | 8/1978 | Showalter | 423/18 X |
| 4,206,182 | 6/1980 | Lafforgue et al. | 423/3 X |
| 4,223,948 | 9/1980 | Stover | 423/20 X |
| 4,243,638 | 1/1981 | Jackovitz et al. | 423/17 |
| 4,302,429 | 11/1981 | Lawes et al. | 423/17 |
| 4,346,936 | 8/1982 | Yan | 423/17 X |
| 4,376,098 | 3/1983 | Yan | 423/20 |

*Primary Examiner*—Deborah L. Kyle
*Assistant Examiner*—Matthew A. Thexton
*Attorney, Agent, or Firm*—Alexander J. McKillop; Michael G. Gilman; Charles J. Speciale

[57] ABSTRACT

The present invention relates to the in situ recovery of mineral values, particularly uranium, from subterranean formations that contain sulfur in organic or inorganic forms where the sulfur causes premature deletion of an oxidant and reduction in permeability of the formation. The adverse effects due to the presence of the sulfur in the formation are substantially reduced in accordance with the present invention by treating the formations with an aqueous solution of iron-complexing agent and then oxident to preferentially oxidize and solubilize at least a portion of the sulfur in the formation. The present process may be applied either as a pre-treatment process to be followed by a leaching process or simultaneously with the leaching process.

15 Claims, No Drawings

PROCESS FOR RECOVERY OF MINERAL VALUES FROM SUBTERRANEAN FORMATIONS

FIELD OF THE INVENTION

This invention relates generally to the in situ leaching of mineral values, in particular uranium, from subterranean formations. More specifically, this invention provides processes for the treatment of highly reducing uranium-bearing formations to improve yields and leaching rates while substantially reducing formation plugging and oxidant consumption.

BACKGROUND OF THE INVENTION

Typically, mineral values have been produced by conventional mining and milling methods. In situ leaching is an attractive alternative for mineral values recovery from ore deposits beneath the water table or too deep for strip mining. The in situ leaching of mineral values from subterranean deposits is well known in the art as a practical and economical means for recovering certain values such as uranium, copper, nickel, molybdenum, rhenium, vanadium and the like. Basically, in situ leaching is carried out by injecting into the subterranean deposit a leaching solution which will solubilize the mineral value desired to be recovered. Conventionally, the leaching solution is brought into contact with the subterranean deposit by injection into one or more injection wells which penetrate the deposit. The leaching solution is introduced into the injection well under sufficient pressure to force it out of the well bore into the adjacent deposit. Continued injection of leaching solution drives the solution through the deposit to one or more spaced-apart production wells where the solution is recovered for subsequent extraction of the mineral values. The number of injection and production wells and the spacing therebetween can vary depending upon the nature of the formation. Additionally, the pattern of injection and production wells can also vary although a typical pattern is the five-spot pattern consisting of a centrally disposed recovery well and four injection wells spaced around the recovery well. Alternatively, a given volume of leaching solution can be injected into a well to percolate into the surrounding formation. Following the injection phase, the well is pumped out and the injected leaching solution is recovered from the same well into which it had been injected.

The first essential step in most leaching operations is to oxidize the mineral values to a form which is soluble in the leaching solution. For example, an essential step in uranium leaching is the utilization of an oxidizing agent to contact the mineral deposits to oxidize the uranium from its insoluble quadrivalent form to its soluble sexivalent form. The deposit is then contacted with the leaching solution to solubilize the sexivalent uranium which is extracted with the solution. The oxidation can be carried out as a separate step or simultaneously with the leaching step by dissolving the oxidizing agent in the leaching solution.

In addition to the mineral values, other oxidant-consuming species such as sulfur compounds, mainly present in the form of iron sulfides, and carbonaceous material are present in the subterranean deposits. Sulfides are usually present in concentrations far exceeding those of the other two materials and, therefore, represent the major oxidant-consuming species. For example, in an in situ uranium leaching process, the sulfides preferentially consume the oxidant available in the injected lixiviant, thus effectively inhibiting the solubilization of uranium until most or all of the scavengers are oxidized. In many formations this scavenging or reducing capacity is so high that the leaching rate is limited by the supply of oxidant. This is particularly true where oxygen is used as the oxidizing agent because of the limited solubility of oxygen in a leaching solution; the scavenging of the oxygen supply is most marked at early stages of the leaching operation. In the typical in situ leaching operation, where the lixiviant, or leaching solution, is injected into one well and the pregnant lixiviant, or leachate, is produced from other wells spaced at a distance, no uranium will be produced in the pregnant lixiviant until the entire formation is essentially oxidized.

It is also well known to those skilled in the art that a complication in the in situ extraction of mineral values by oxidative treatment of a carbonaceous matrix is the deposition of sulfur. The formation of elemental sulfur can block the pore channels or lodge in pore throat openings thereby inhibiting the production of the enriched leach solution.

The present invention overcomes the foregoing deficiencies by providing a process for the recovery of mineral values from subterranean formations which contain sulfur where the loss of permeability and oxidant is substantially reduced.

SUMMARY OF THE INVENTION

The present invention relates to the in situ recovery of mineral values, particularly uranium, from subterranean formations that contain sulfur in organic or inorganic forms where the sulfur causes premature depletion of an oxidant and reduction in permeability of the formation. The present invention substantially reduces the adverse effects sulfur species have on permeability and premature depletion of oxidant by injecting into the formation an aqueous solution of iron complexing agent and an oxidant to preferentially oxidize and solubilize at least a portion of the sulfur in the formation. The present process may be applied either as a pretreatment process to be followed by a leaching process or simultaneously with the leaching process.

DETAILED DESCRIPTION OF THE INVENTION

In the following description and examples, the invention will be described in connection with the recovery of uranium values by the solubilization thereof from uranium-bearing formations. However, it should be clear that the invention is applicable to the solution leaching of other mineral values capable of forming soluble reaction products with leaching solutions. Thus, for example, substances such as vanadium, molybdenum, nickel, copper, the rare earths and the like are recovered using the process of the present invention.

As an illustration, the leach chemistry of a uranium ore body can be described by the following equations using hydrogen peroxide ($H_2O_2$) as oxidant:

$$UO_2 + H_2O_2 \rightarrow UO_3 + H_2O \tag{1}$$

$$UO_3 + 3HCO_3^- \rightarrow UO_2(CO_3)_3^{-4} + H_2OH^+ \tag{2}$$

$$Fe^{+2} + \tfrac{1}{2}H_2O_2 \rightarrow Fe^{+3} + OH^- \tag{3}$$

$$S^{-2} + 4H_2O_2 \rightarrow SO_4^{-2} + 4H_2O \tag{4}$$

$$S^{-2} + H_2O_2 \rightarrow S^o + 2OH^- \tag{5}$$

Equations 1 and 2 describe uranium oxidation and dissolution, respectively. Oxidant, which is normally hydrogen peroxide and/or oxygen, is added to a leach solution composed of either sodium or ammonium carbonate and injected into the ore body. Dissolved sexivalent uranium is transported through the ore body to the recovery wells in the form of a uranyl carbonate complex. The above equations show that more oxidant is consumed by the oxidation of the iron sulfide compounds than by the oxidation or uranium. Furthermore, sulfur compounds inhibit uranium oxidation by causing partial plugging of the formation. It is well known to those skilled in the art that a complication in the in situ extraction of uranium by oxidative treatment of a carbonaceous matrix is the deposition of sulfur. The sulfur can block pore channels or lodge in pore throat openings, thereby reducing the effective premeability of the formation.

The sulfur present in the mineral values formation is in essentially two forms: inorganic, primarily metal pyrites, and organic sulfur. The inorganic sulfur compounds are mainly iron pyrites, with lesser amounts of metal pyrites and metal sulfates. The organic sulfur may be in the form of thiols, disulfides, sulfides and thiophenes (substituted, terminal, and sandwiched forms). Depending on the region, the sulfur content can be primarily in the form of either inorganic sulfur or organic sulfur. For example, the eastern region of the United States contains primarily inorganic sulfur as compared to the western region which contains a larger amount of organic sulfur. Studies have shown that iron sulfides exist in both Texas and Wyoming uranium ores as a mixture of pyrite and marcasite. Furthermore, uranium mineralization was shown to exist as a fine granular material imbedded in iron sulfide crystals and sand grains.

The novel process of this invention substantially reduces the adverse effects resulting from the presence of inorganic sulfur in a formation subjected to in-situ leaching by injecting into the formation an aqueous solution of iron complexing agent and an oxidant to preferentially solubilize the pyritic sulfur present in the formation. The process may be used as a preflush to substantially reduce the pyritic sulfur content in the formation and thus reduce premature oxidant depletion in a following uranium leaching solution while also reducing the plugging of the formation. The process of the present invention could also be used in conjunction with a uranium leaching solution to substantially reduce the permeability reduction that would otherwise be caused by the deposition of insoluble sulfur.

The most suitable amount of iron complexing agent employed depends on the pyrite content of the formation and the complexing agent employed. A mole ratio of complexing agent to pyrite of from about 0.05 to 10 can be suitably employed. It is generally convenient to employ aqueous solutions of iron complexing agent which are from about 0.05 to about 1.0 molar with respect to iron complexing agent.

Suitable iron complexing agents for use in this invention are compounds which can be complex ferrous and/or ferric ions. Preferred complexing agents are compounds which can form ferrous complexes or ferric complexes having a stability constant of $-\log K$ greater than 1, and preferably greater than 2.0.

Convenient compilations providing stability constants of many complexing agents for iron are Martell and Calvin, "Chemistry of the Metal Chelate Compounds", U.S. copyright 1952, and "Stability Constants of Metal-Ion Complexes," supplement No. 1, Special Publication No. 25, published by The Chemical Society, U.S. copyright 1971.

Examples of suitable iron complexing agents include the following: carboxylic acids and carboxylic acid salts, including hydroxy carboxylic acids and salts, for example, oxalic acid, malonic acid, succinic acid, citric acid, tartaric acid, lactic acid, gluconic acid, salicylic acid, and salts thereof; diols and polyols, for example, glycol, glycerine, butane-1, 3-diol, mannitol, sorbitol, glucose, lactose, fructose and sucrose; amines for example, ethylenediamine, glycine, and asparagine and salts thereof; amino acids and amino acid salts; amino polycarboxylic acids and amino polycarboxylic acid salts, for example, N-hydroxy-ethyl-iminodiacetic acid, nitrolotriacetic acid, N,N-di(2-hydroxylethyl)glycine and N,N, N',N-ethylene-diamine-tetraacetic acid and salts thereof; phosphonic acids and phosphonic acid salts, for example, ethane-1-hydroxy-1, 1-diphosphonic acid; and condensed phosphates, for example, trimetaphosphoric acid, tripolyphosphoric acid and salts thereof. Especially suitable salt forms of iron complexing agents are the potassium, sodium and ammonium salts. Mixtures of complexing compounds can be very desirably employed.

As will be recognized by those skilled in the art, the stability of the ferrous and ferric complexes formed will often be affected by the pH of the aqueous medium. In such cases, it is contemplated that the pH will be such that a stability constant $-\log K$ greater than 1 is maintained and more preferably, the optimum iron complexing pH for the particular complexing agent will be maintained. For example, a pH of from about 4.0 to 7.0 is preferred when the complexing agent is oxalic acid, and its corresponding salts, for example, sodium, potassium and ammonium salts. The particular pH employed can also affect the salt form of the complexing agent employed, and such iron complexing salts are complexing agents within the scope of this invention.

Many of the complexing agents useful in the process of this invention can be very desirably formed in situ prior to or in the course of the process. For example, cellulosic materials can be oxidized to form a complex mixture of polyols, hydroxy carboxylic acids, carboxylic acids and corresponding acid salts which can provide a complexing solution meeting the requirements of this invention. (Any aqueous solution fo complexing agents which complexes the iron in the mineral value formation satisfies the requirements of this invention).

Oxalic acid salts, for example, sodium, potassium and ammonium oxalate are preferred complexing agents for use in the process of the invention in that they are effective complexing agents which are readily available and inexpensive.

Included among the oxidants which are useful herein are organic oxidants and inorganic oxidants.

The organic oxidants include by way of example hydrocarbon peroxides, hydrocarbon hydroperoxides and hydrocarbon peracids wherein the hydrocarbon radicals in general contain from about 1 to about 30 carbon atoms per active oxygen atom. With respect to the hydrocarbon peroxides and hydrocarbon hydroperoxides, it is particularly preferred that such hydrocarbon radical contain from about 4 to about 18 carbon atoms per active oxygen atom, i.e., per peroxide linkage, and more particularly from 4 to 16 carbon atoms per peroxide linkage. With respect to the hydrocarbon peracids, the hydrocarbon radical is defined as that radical which is attached to the carbonyl carbon and it is preferred that such hydrocarbon radical contain from 1 to about 12 atoms, more preferably from 1 to about 8 carbon atoms, per active oxygen atom. It is contemplated within the scope of this invention that the organic oxidants can be prepared in situ.

Typical examples of organic oxidants are hydroxypeptyl peroxide, cyclohexanone peroxide, t-butyl-perbenzoate, methyl ethyl ketone peroxide, dicumyl peroxide, t-butyl hydroperoxide, di-t-butyl peroxide, pinane hydroperoxide, 2,5-dimethylhexane-2,5-dihydroperoxide, tetrahydronaphthalene hydroperoxide and cumene hydroperoxide as well as organic peracids, such as performic acid, peracetic acid, trichloroperacetic acid, perbenzoic acid and perphthalic acid.

Inorganic oxidants include by way of example, oxygen, singlet oxygen, ozone, peroxides and superoxides. Typical examples of inorganic peroxides are $H_2O_2$, $KM_nO_4$, $KO_2$, $Na_2O_2$, and $Rb_2O_2$; typical examples of inorganic superoxides are $KO_2$, $RbO_2$, $CsO_2$, $Na_2SO_5$ and $Na_2S_2O_8$.

Oxygen is a preferred oxidant.

In general, the mole ratio of oxidant to sulfur is from about 0.5 to about 10 atoms of active (i.e., reduceable) oxygen per atom of sulfur. More or less oxidant could be employed, however. The most effective oxidation will generally occur when the mole ratio of oxidant pyritic sulfur is greater than about 4, for example, when 5 to 10, atoms of active oxygen per atom of sulfur are present.

The preferred oxidant, oxygen, can be present as pure oxygen gas or it can be mixed with other inert gases. For example, air on air enriched with oxygen can be suitably employed as a source of gaseous oxygen. Preferably, the gaseous oxygen is above atmospheric pressure, for example, pressures of from about 5 to 500 psig. If the oxygen is mixed with other gases, the partial pressure of oxygen is most suitably within the pressure range mentioned hereinbefore.

Elevated temperatures can be desirably employed to accelerate the oxidation of sulfur. For example, temperatures of from about 150° to 500° F. can be suitably employed. The temperature is varied inversely with the pressure applied in the formation. The higher the pressure the lower is the temperature needed for optimum sulfur solubilization. Under these reaction conditions, at least a portion of the sulfur (pyritic and organic sulfur) can be preferentially oxidized.

In accordance with one aspect of the invention, treatment of the formation with an aqueous solution containing an iron complexing agent and an oxidizing agent is performed prior to the uranium leaching operations. When the formation is contacted with the above solution, some sulfur, primarily pyritic sulfur can be oxidized to form water soluble sulfur compounds, for example, water soluble sulfate salts. Substantially all of the pyritic and some organic sulfurs can be removed from the formation by the above process. When the formation is later subjected to a uranium leaching operation, the premature depletion of the oxidant is substantially reduced because the majority of the formation sulfur is already oxidized if not completely removed. Furthermore, the majority of the formation sulfur is solubilized thus substantially reducing the adverse effect of formation plugging that would have otherwise been caused by the insoluble sulfur compounds.

In accordance with another aspect of the present invention, the iron complexing agent is introduced with the leaching solution which contains a leaching agent and an oxidant. The simultaneous application of the present invention with a uranium leaching process substantially reduces the adverse partial plugging of the formation that would otherwise occur due to the insoluble sulfur compounds.

Depending on the nature of the subterranean deposit, the typical uranium leaching solution may be acidic, for example an aqueous sulfuric acid solution, or may comprise an alkaline carbonate solution. A suitable leaching solution is one that utilizes oxygen and bicarbonates. The bicarbonate may be formed in-situ by the injection of caustic into the formation followed by the injection of carbon dioxide. The bicarbonate is monitored so as to keep the pH of the leachate at 7.2 to 9.0. The oxygen concentration is usually at saturation which varies with the bottom hole pressure of the injection well. For example, some New Mexico uranium wells are drilled to about 2000 ft. which would yield a bottom hole pressure of about 800 psi thus resulting in oxygen saturation at about 1000 p.p.m. On the other hand, some Texas uranium wells are drilled to 400 ft. which would yield a bottom hole pressure of about 175 PSI thus resulting in oxygen saturation at about 350–400 p.p.m. A suitable acidic leaching solution is that disclosed in U.S. Pat. No. 4,105,253 to Showalter which is hereby incorporated by reference. In the above patent, carbon dioxide is admixed with water to form a carbonic acid solution for use as a leaching solution for extraction of uranium by solution mining. An oxidizing agent, preferably oxygen, is also present in the solution. The above are mere examples and should not be considered as limiting on the present invention.

In addition to the foregoing, the leaching rate of a leaching system can be further enhanced by the introduction of the sulfate ions into the system. In the ore bodies where the present invention is applicable, the sulfate ion will be produced as a by-product of the oxidation and solubilization of the sulfur in the formation. If the sulfate ion concentration is in excess of optimum levels, then some of the solution may be produced from the formation. On the other hand, if the present process produces sulfate ions at below optimum levels additional sulfate solutions may be accordingly added. The optimum sulfate ion level must be determined by observation, within the range of 0.1 to 20 percent by weight, based on the leaching solution. The table set forth below reports data showing a two-fold enhancement of leaching rate produced by the addition of sulfate ion to a high pressure carbon dioxide/ oxygen leaching system.

| Column No. | 1 | 2* | 3 |
|---|---|---|---|
| Ore | | 4U-360-2 | |
| Operating Conditions | | | |
| $O_2$, psig | 500 | 500 | 500 |
| $CO_2$, psig | 300 | 300 | 300 |
| NaCl, g/l | 1 | 1 | 1 |
| $Na_2SO_4$, g/l | 74 | 74 | 0 |
| Results | | | |
| Av. $U_3O_8$ in leachate ppm. | 113 | 115 | 57 |
| $U_3O_8$ leach rate, %/pv. | 2.6 | 2.6 | 1.3 |

*Preleached with $CO_2/H_2O$.

The foregoing description of the invention has been directed to particular details in accordance with the requirements of the Patent Act and for purposes of explanation and illustration. It will be apparent, however, to those skilled in this art that many modifications and changes may be made without departing from the scope and spirit of the invention. It is further apparent that persons of ordinary skill in this art will, on the basis of this disclosure, be able to practice the invention within a broad range of process conditions. It is our intention in the following claims to cover all such equivalent modifications and variations as fall within the true scope and spirit of our invention.

What is claimed is:

1. A process for the recovery of uranium values from a subterranean formation containing pyritic sulfur compounds and penetrated by injection and production systems, comprising the steps of:
   (a) introducing into the formation via the injection system an aqueous solution of iron-complexing agent and an oxidant to preferentially oxidize and solubilize at least a portion of the sulfur compounds in the formation and inhibit plugging of the formation by insoluble sulfur compounds;
   (b) then introducing a lixiviant comprising a uranium-leaching agent and an oxidant into the formation through the injection system;
   (c) allowing the lixiviant to leach out uranium values in the formation; and
   (d) producing the lixiviant and uranium values from the formation via the production system.

2. The process of claim 1, further comprising recovering uranium values from the lixiviant produced in step (d).

3. The process of claim 1 wherein a certain amount of solubilized pyritic sulfurs in step (a) is retained in the formation, said amount being sufficient to cause substantial enhancement in the subsequent solubilization of uranium values, and the balance is produced from the formation prior to step (b).

4. The process of claim 1 further comprising the step of producing the aqueous solution containing sulfur to reduce the sulfur content in the formation.

5. The process of claim 1 wherein the aqueous solution of iron complexing agent is maintained at an elevated temperature of about 150° F. to 400° F.

6. The process of claim 1 wherein the iron complexing agent is a compound which forms ferrous or ferric complexes having a stability constant $-\log K$ of more than one.

7. The process of claim 1 wherein the oxidant of step (a) is oxygen.

8. The process of claim 7 wherein the oxygen is maintained at a pressure of from 5 to 500 psig.

9. The process of claim 1 wherein the iron complexing agent is selected from the group consisting of carboxylic acids, and hydroxy carboxylic acids and their salts, diols and polyols, amines, amino acids and amino acid salts, amino polycarboxylic acids and their salts, phosphonic acids and their salts, condensed phosphates, and salts of condensed phosphates.

10. The process of claim 9 wherein the salts are alkali metal and ammonium salts.

11. The process of claim 1 wherein the oxidant of step (a) is selected from the group consisting of ozone and singlet oxygen.

12. The process of claim 1 wherein the oxidant of step (a) is an organic oxidant selected from the group consisting of hydrocarbon peroxides, hydrocarbon hydroperoxides and peracids.

13. The process of claim 1 wherein the oxidant of step (a) is an inorganic oxidant selected from the group consisting of peroxides and superoxides.

14. The process of claim 1 wherein the lixiviant is $CO_2/O_2$.

15. The process of claim 1 wherein the aqueous solution of iron complexing agent is maintained at elevated temperatures.

* * * * *